Figure 1:
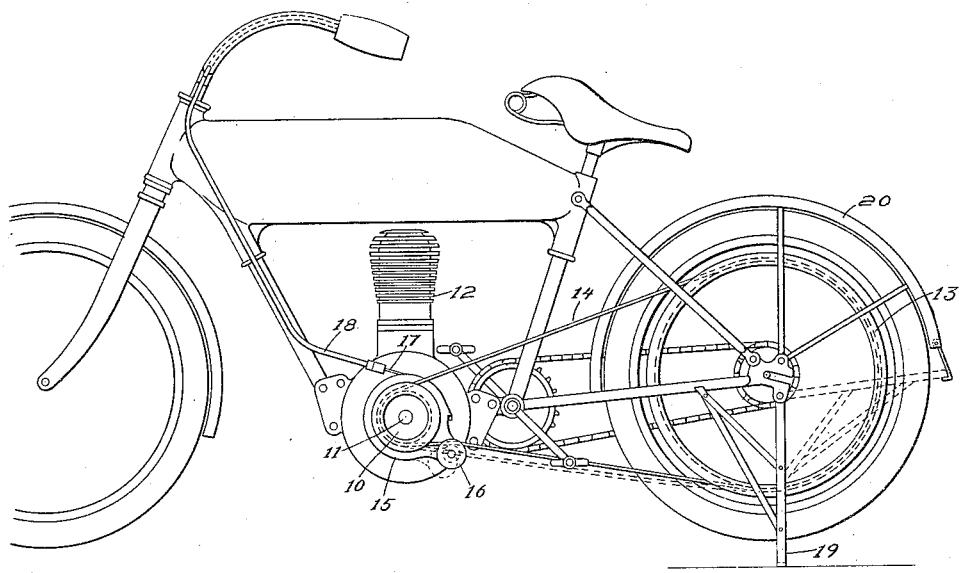

N. H. SCHICKEL.
POWER TRANSMISSION MECHANISM.
APPLICATION FILED NOV. 29, 1911.

1,169,357.

Patented Jan. 25, 1916.

WITNESSES:
H. E. A. Raabe
Jeannette Williams

INVENTOR
Norbert H. Schickel
BY
Clair W. Fairbanks
ATTORNEY

THE COLUMBIA PLANOGRAPH CO., WASHINGTON, D.

UNITED STATES PATENT OFFICE.

NORBERT H. SCHICKEL, OF STAMFORD, CONNECTICUT.

POWER-TRANSMISSION MECHANISM.

1,169,357. Specification of Letters Patent. Patented Jan. 25, 1916.

Application filed November 29, 1911. Serial No. 663,112.

*To all whom it may concern:*

Be it known that I, NORBERT H. SCHICKEL, a citizen of the United States, and a resident of Stamford, county of Fairfield, and State of Connecticut, have invented certain new and useful Improvements in Power-Transmission Mechanism, of which the following is a full, clear, and exact description.

This invention relates to certain improvements in power transmission mechanism, particularly of the type adapted to be employed on motor cycles.

The invention provides a construction whereby the engine of the motor cycle may be readily started without starting the motor cycle and whereby power may be gradually applied to the latter after the rider has taken his seat.

Power transmitting mechanism including two pulleys, a belt from one to the other and suitable means for tightening the belt has been used in a wide variety of machines including motor cycles and it is to this type of mechanism that my invention relates. My invention is not limited to motor cycles but is primarily designed for use where the simplest possible mechanism is desired which will permit a high speed driver to rotate without rotating the driven member and will then permit a gradual application of power to the driven member. As this is desired in motor cycles I will describe it so applied.

In motor cycles having a belt drive it is common practice to provide the small pulley on the motor with lagging to aid in preventing the belt from slipping but even then it is often difficult to keep the belt from slipping when there is a heavy load on the engine and particularly when the belt is wet from rain or mud. If the belt be loosened and permitted to slip while the engine is running, either the lagging or the belt or both are burned, due to the high friction produced. It is thus evident that the engine cannot be ordinarily permitted to run while the rear wheel is standing still unless a clutch of some kind be employed. A clutch adds to the complexity and expense of the machine and cannot be readily adjusted or repaired by the average motor cycle owner. Without a clutch it is customary to start the machine by running with it or pedaling it along until the engine takes up this cycle of operation and assumes the load. The objection to this is obvious especially if the engine runs imperfectly at low speed or when cold.

In my improved construction I avoid the expense and complexity of a clutch and the liability of burning or otherwise injuring the belt or pulley. I am able to start the motor by tightening the belt and turning the pedal either by hand or by foot with the rear wheel supported on the stand. After the engine has started I loosen the belt and stop the rear wheel while the engine continues running with the drive pulley freely slipping within the belt, with very little friction. The machine may then be removed from the stand and started as gently as desired by slowly tightening the belt. I secure this result by so forming one of the pulleys, preferably the drive pulley, that a loose belt may easily slip over the smooth portion of the face but the belt on being tightened is drawn into contact with irregularities in the surface which will cause the belt to bind without slipping. Furthermore these irregularities in the pulley face are such that when mud and water spatter on the belt or pulley the slipping which would tend to occur is automatically counteracted and an efficient tractive effect is maintained.

Reference is to be had to the accompanying drawings which form a part of this specification and in which similar reference characters indicate corresponding parts in the different views.

Figure 2:
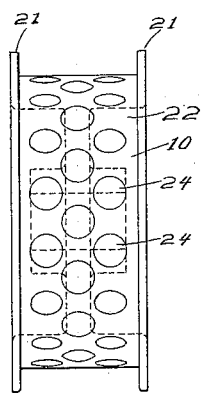
Figure 3:
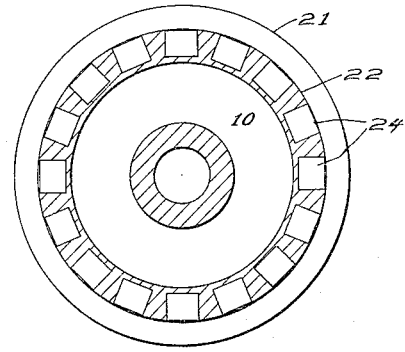
Figure 4:
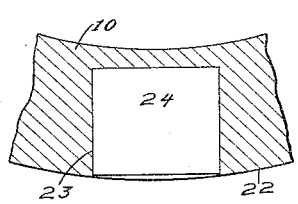

Figure 1 is a side elevation of a motor cycle involving my invention and having its rear wheel supported upon the stand ready for the starting of the engine. The position of certain of the parts is illustrated in dotted lines in the second position which they may assume; Fig. 2 is a face view of the drive pulley; Fig. 3 is a transverse section therethrough; and Fig. 4 is a sectional detail similar to a portion of Fig. 3 on a larger scale.

In the preferred construction illustrated, I mount a drive pulley 10 directly upon the shaft 11 of the motor 12 and transmit the power from this pulley to a larger pulley 13 on the rear wheel by means of a flat belt 14. Mounted to oscillate about the motor shaft 11 as a center is a plate 15 carrying a belt tightening pulley 16 moved into or out of operation in any suitable manner, as, for instance, by a wire 17 within a tube 18 leading to the handle bar, as is shown and claimed in my co-pending application Serial No. 663111 filed November 29th, 1911. Pivoted to the rear portion of the frame is a stand 19, which when swung to the position shown in solid lines in Fig. 1, serves to support the rear wheel out of engagement with the ground. This stand may be swung to the position shown in dotted lines, and may then be supported from the rear mud guard 20. The parts so far referred to, with the exception of one of the pulleys, do not in themselves involve any novel features hereinafter claimed, and the details are unimportant. The pulleys may have flanges 21 to retain the belt in position, and between these flanges on one of the pulleys, preferably the drive pulley, is a smooth, peripheral surface 22, in which there are a plurality of openings or sockets 23. Within each opening or socket there is an insert 24, the character of which may vary, but which is softer than the hard material of the pulley. Preferably these inserts are of cork, although other material might be employed, and in some constructions I might employ a soft metal as, for instance, lead. These inserts have their outer surfaces so positioned that they are without frictional contact with the belt when the latter is loose. Preferably these surfaces are very slightly below the arc of curvature of the periphery of the pulley, as is illustrated on an enlarged scale in Fig. 4. The outer surface may be slightly concave or it may lie substantially in a chord of the circle or be very slightly convex.

I am aware that cork inserts in pulleys are not new with me, but in all drive pulleys having such inserts and with which I am familiar, they project beyond the arc of curvature of the pulley so as to positively and frictionally engage with the belt at all times.

My improved transmission mechanism is operated substantially as follows: The rear portion of a motor cycle is supported on the stand 19 and the belt is tightened by the adjustment of the belt tightening pulley 16. The drive pulley being of comparatively small diameter and the belt being drawn taut, there will be a firm gripping engagement between the belt and the drive pulley, so that there will be no slipping of one in respect to the other. By turning the pedals, the rear wheel is caused to turn and power is transmitted through the belt. After the engine takes up its cycle of operations, the carbureter, timer, magneto and other parts may be adjusted or regulated to control the engine in the desired manner. The belt is then loosened by releasing the belt tightener. The belt being of heavy, thick material, does not really conform to the irregularities of the surface of the drive pulley except when drawn taut and, therefore, when the belt is loosened, lies in engagement with only the smooth, cylindrical portion of the pulley face and is in no way affected by the inserts or depressions in the pulley. The hard smooth surface of the pulley may readily slip within the loose belt, and the rear wheel and belt of the pulley will stop moving and the engine continue to turn over without any material friction between the belt and drive pulley and without liability of burning or otherwise injuring the belt. When the rear wheel stops or has been stopped, it may be lowered into engagement with the ground and the stand swung upwardly to the position indicated in dotted lines. The rider may then mount the machine and by slowly tightening the belt, power may be gradually applied to the rear wheel and the machine may thus be set in motion. The belt when drawn taut will be forced to conform with the irregularities of the surface of the pulley and the full power of the engine utilized without waste. In case wet or muddy roads are encountered, the spattering of mud on the belt and the resultant wetting of it would tend to cause the belt to slip were the latter an ordinary metal pulley, but particles of the sand, grit and mud carried to the drive pulley by the belt will tend to adhere to the soft inserts and act as a friction material between the belt and the inserts. This will cause good frictional contact between the two, even though the belt be wet and slippery. As the belt dries, the particles of sand and dirt on the belt and inserts will no longer adhere and both the belt and inserts will free themselves of such sand and grit. When it is again desired to start the machine, the belt may be loosened and the pulley permitted to turn freely, as above set forth.

My present invention is of course not limited to the specific details any of the parts, except in so far as they are necessary to secure the results above set forth and except in so far as they are defined in the appended claims.

Having thus described my invention, what I claim as new and desire to secure by Letters Patent is:

1. As a new article of manufacture, a pulley adapted for use in connection with a belt of varying tension, said pulley having a hard, smooth, cylindrical, peripheral surface which may freely slip within the belt without burning the pulley or the belt when the latter is loose, and said pulley having portions of its periphery without frictional contact with the belt when the latter is loose, and serving to aid in preventing the relative slipping of the pulley and the belt upon the tightening of the latter and said portions forming good frictional contact with the belt to prevent slipping, upon receiving foreign particles which would tend to cause the belt to slip on the hard surface of the pulley.

2. As a new article of manufacture, a pulley adapted for use in connection with a belt of varying tension, said pulley having a smooth, cylindrical, peripheral surface which may freely slip within the belt without burning the pulley or the belt when the latter is loose, and said pulley having an insert of soft material, the outer surface of which is without frictional contact with the belt when the latter is loose and serving to aid in preventing the relative slipping of the pulley and the belt upon the tightening of the latter.

3. As a new article of manufacture, a belt pulley having a hard, smooth, cylindrical, peripheral surface and inserts in said surface made of a material softer than the face and being slightly below the normal surface of the face and so arranged that when the belt is loose it may slip over the hard part of the face, but when tightened it will be drawn into frictional contact with the softer inserts.

4. As a new article of manufacture, a pulley in combination with a belt of varying tension, said pulley having a hard, smooth, cylindrical peripheral surface which may freely slip within the belt without burning the pulley or the belt when the latter is loose, and said pulley having portions of its peripheral surface made of a material softer than the said cylindrical peripheral surface and slightly below said surface, without frictional contact with the belt when the latter is loose, and serving to aid in preventing the relative slipping of the pulley and the belt upon the tightening of the latter and said portions forming good frictional contact with the belt to prevent slipping, upon receiving foreign particles which would tend to cause the belt to slip on the hard surface of the pulley.

In testimony whereof I have signed my name to this specification in the presence of subscribing witnesses.

NORBERT H. SCHICKEL.

Witnesses:
　WORTHINGTON CAMPBELL,
　CLAIR W. FAIRBANK.

Copies of this patent may be obtained for five cents each, by addressing the "Commissioner of Patents, Washington, D. C."